INVENTOR.
GERALD L. ANDERSON
BY Daniel Rubin
ATTORNEY

United States Patent Office

3,517,950
Patented June 30, 1970

---

3,517,950
INSULATING PIPE UNION
Gerald L. Anderson, Bradford, Pa., assignor to Dresser
Industries, Inc., Dallas, Tex., a corporation of Delaware
Filed Apr. 26, 1968, Ser. No. 724,369
Int. Cl. F16l *19/02*
U.S. Cl. 285—52                           4 Claims

ABSTRACT OF THE DISCLOSURE

An insulating pipe union for maintaining electrical insulation between coupled pipe fittings or sections. The union utilizes a metal-to-gasket-to-metal seal which pressure seals against line content leakage without overstressing the electrical insulator contained between the separated component elements.

BACKGROUND OF THE INVENTION (1) The field of art to which the invention pertains includes the art of Pipe Joints or Couplings, in Patent Office class 285 as particularly directed to sub-classes 47 et seq. thereof.

(2) Electrically insulated pipe couplings or unions are well-known in the art and are used extensively to electrically insulate sections of metal pipe, fittings or the like from each other and to minimize corrosion caused by cathodic action. As such, couplings or unions for this purpose are widely marketed and can be considered exemplified by the U.S. Pats. 2,569,333; 2,757,943; 2,794,658; 2,867,463; 3,115,354; 3,185,501 and others.

Each of the devices represented by these prior art patents is capable of providing varying degrees of satisfactory performance in achieving the objective of electrical insulation. Yet, by virtue of their constructions, these prior devices encounter hidden unnoticed failures resulting in reduced effectiveness and requiring a high order of maintenance. Specifically, such prior type devices have resulted in a high frequency of insulator breakdown as a result of cracking, cold flow or the like resulting in electrical leak paths and/or pressure leaks. Because either the insulator alone or the insulator serially arranged with the gasket seal have had to absorb the complete compressive loading for effecting a pressure tight seal, the yield point of the insulator is easily exceeded without any indication thereof outward of the union. As should be appreciated, this failure being concealed from open view generally goes unnoticed until the damage sought to be prevented by the device has in fact already occurred. Where later failure results in a nut torque reduction, a serially arranged gasket decompresses to lose the intended seal. Any of these failure types of course incur substantial unwanted maintenance and for all practical purposes defeat the purpose for which the union was originally employed.

SUMMARY

This invention relates to an improved electrically insulated pipe coupling or union. By means of the invention hereof, there has been discovered how the insulator failure problems associated with such prior art type devices, is substantially if not completely eliminated. Specifically, it has been found that by construction a union with a metal-to-gasket-to-metal seal in generally parallel compressive relation with the electrical insulator, yet absorbing the predominance of compressive forces, the previous undesirable overloading is eliminated. Whatever compressive forces are applied to the sealing gasket for maintaining a pressure tight seal with respect to the pipe line contents, the transmittal thereof to the insulator is minimal.

It is therefore an object of the invention to provide an improved electrically insulating pipe coupling or union.

It is a further object of the invention to provide a novel electrically insulating pipe coupling or union able to withstand high compressive forces for effecting a pressure tight seal without imposing an overstress on the electrically insulating components.

It is a still further object of the invention to provide a novel electrically insulating pipe coupling or union which substantially if not completely eliminates the hidden failures as have been associated with such prior art devices.

BRIEF DESCRIPTION OF THE DRAWINGS

Referring now to FIG. 1, there is illustrated the union hereof designated 10, integrally part of a valve assembly 11 as representing a preferred embodiment for the purposes of disclosure. It is to be understood however that the union or coupling can per se constitute a whole fitting separate and disconnected from any other valve fitting or pipe with which it is to be employed. Conversely, it can likewise be integrally connected to any of the aforementioned piping components as is well-known in the art.

Figure 1:
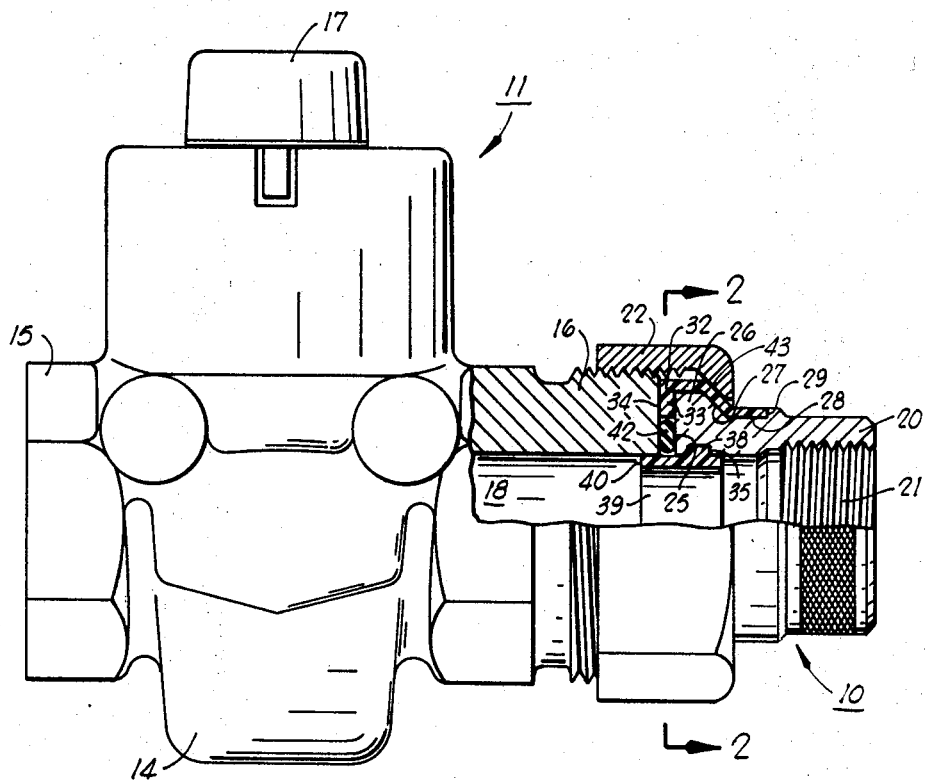
FIG. 1 is an elevation of a meter valve in combination with a union partially in section of the type hereof.
Figure 2:
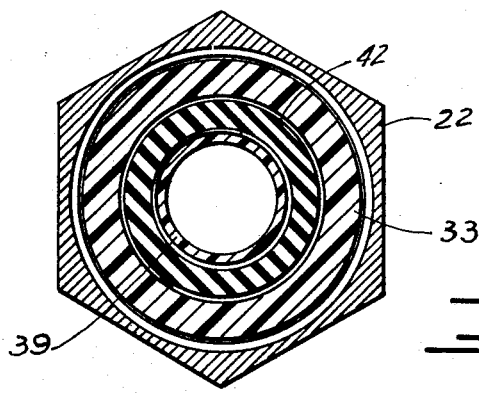
FIG. 2 is a sectional elevation taken substantially along the lines 2—2 of FIG. 1.

The valve hereof, for the purposes of disclosure represents a plug valve of the type disclosed in U.S. Pat. No. 3,360,236 frequently employed for meter service and comprising a body 14 having a female threaded boss 15 leading to a flow passage 18 extending through the valve and a male threaded opposite end 16 to accommodate the union coupling hereof. Valve operation is effected via a rotatable bonnet nut 17 which controls the valve opening and closing as required.

The union or coupling hereof can be considered to include the end 16 of the valve having a radial endface 34. Another suitable and/or separate end fitting member could alternatively be included by which an external connection can be made to accommodate a component to be coupled. The opposite tail end of the union consists of a tailpiece member 20 having a female thread 21 to accommodate a pipe connection thereto and is otherwise adapted for mounting to the end 16 via the hexagonal coupling nut 22. Tailpiece 20 extends coaxially with the valve inlet (or outlet) from its rear threaded end toward flow passage 18 and terminates in a radially extending front face 25 spaced from and opposite face 34. Face 25 extends from flange 26 that connects via shoulder forming frusto-conical surface 27 to a necked-down annular periphery 28. The latter surface terminates rearwardly at an annular radial shoulder 29 defining the terminal edge for a contour-fitting insulator jacket 32.

Jacket 32 preferably is molded onto the tailpiece as shown although it need not be and terminates at its forward end in a folded over radial section 33 interposed between the endfaces 25 and 34 at the radially outward portion thereof. The jacket is of an electrically insulating, tough, durable plastic composition such as nylon. In a preferred embodiment, the jacket comprises a composition marketed as Zytel being a trademark of E. I. du Pont for a weather stabilized composition with high dielectric strength. It need not be plastic or of a plastic composition providing its general durability and electrical characteristics are appropriate. Compositions of rubber as are conventionally available are generally undesirable. Hard rubber is normally too brittle to withstand even minimal loading while soft rubbers normally are characterized by insufficient crushing resistance as occurs when an angular stress is applied to the joint.

On the internal surface of the tailpiece, there is provided an annular grooved recess 35 in which is secured a mold fitted flange 38 of an annular ring 39. The ring has an axial width extending forward thereof to past the radial end faces 25 and 34 to place the circumference at ring end 40 into substantially surface support engagement with the interior of bore passage 18 serving to ensure proper axial alignment therebetween. For these purposes, ring 39 likewise comprises an electrically insulating composition preferably although not necessarily the same as jacket 32.

Supported axially between end faces 25 and 34 and radially between the outer periphery ring 39 and the inward end of flange 33 for effecting a pressure-tight seal thereat, is a compressive elastomeric O-ring gasket 42 shown in post-compression in FIG. 1. Gasket 42 is of a composition compatible with the line contents to be contained and for gas use normally comprises Buna "N" rubber, Buna "S" rubber, natural rubber or other well-known synthetics. By this means, as coupling nut 22 is screwed inwardly of the valve for sealing against line content leakage thereat, the interior chamfered surface 43 of the nut bears against the corresponding portion of jacket 32 urging the tailpiece toward end face 34. The compressive force applied by the nut ensures the leak-tight joint. O-ring gasket 42 therebetween predominantly absorbs the applied forces by being of sufficient initial diameter when uncompressed to effect a leak-proof seal prior to the nut exerting excessive compression forces against juxtaposed portions of jacket 32. Accordingly, the predominance of compressive forces applied by the coupling nut 22 are absorbed by the O-ring, while forces applied to the insulating plastic jacket 32 are minimal to well below the yield point thereof. Should failure occur in the jacket notwithstanding, unlike such prior art devices, at least the pressure seal of the union will be unaffected.

By the above description, there is disclosed a novel and improved electrically insulating union in which an O-ring gasket is supported interposed between the end pieces in compressibly parallel relation with the electrical insulator. Since the compressive forces are largely absorbed by the O-ring in contrast to the insulator, overstressing of the latter is substantially, if not completely, eliminated as to overcome those insulator failure problems associated with such prior art devices. This enables joint sealing against leakage of line contents to be independent of the insulator material such that even should the insulator unknowingly become cracked or otherwise become defective from use or age, the pressure seal continues to be assured.

The embodiments of the invention in which an exclusive property or privilege is claimed are defined as follows:

1. A union for the forming of a coupled pipe joint comprising in combination:
   (a) a first axially extending annular member for receiving a first pipe component to be coupled and terminating in a radially extending endface;
   (b) a second axially extending annular member for receiving a second pipe component to be coupled and terminating in a radially extending endface tandemly spaced from and opposite the endface of said first member;
   (c) said first member being exteriorly threaded and said second member being shouldered axially displaced from its said endface;
   (d) an electrically insulating jacket annularly extending from at least over the shouldered extent of said second member to a termination, axially interposed between said opposing endfaces radially outward of the innermost radial extent thereof;
   (e) an annular elastomeric gasket coaxially aligned between the opposing endfaces of said members radially inward of said jacket termination, said gasket when uncompressed being of relatively greater axial extent than the radially extending portion of insulating jacket thereat and having a sufficient compression resistance to absorb at least the predominance of an applied compression force required to effect pressure sealing engagement thereat whereby when said required compression force is applied said radially extending jacket portion will not be stressed beyond its yield point; and
   (f) a coupling nut axially extending from a threaded connection with the thread of said first member to behind the shoulder of said second member and adapted when screwed toward the former to apply a compression force sufficient to draw said endfaces into pressure sealing engagement against said gasket.

2. A union according to claim 1 including an annular electric insulator secured against the axial interior wall of one of said members to coaxially extend past said tandem endfaces into surface supporting engagement with the interior axial wall of the other of said members.

3. A union according to claim 1 in which said first member is a lateral integrally connected extension of a shutoff valve.

4. A union according to claim 3 including an annular electric insulator secured against the axial interior wall of said second member to coaxially extend past said tandem endfaces into surface supporting engagement with the interior axial wall of said valve.

References Cited

UNITED STATES PATENTS

| 2,578,933 | 12/1951 | Hunter et al. | 285—52 X |
| 2,726,104 | 12/1955 | Buitnoff et al. | |
| 2,867,463 | 1/1959 | Snider | 285—52 X |
| 3,115,354 | 12/1963 | Bowan et al | 285—52 |
| 3,284,107 | 11/1966 | West | 285—55 |

FOREIGN PATENTS

| 103,968 | 5/1938 | Australia. |
| 745,513 | 11/1966 | Canada. |
| 1,237,860 | 6/1960 | France. |

DAVID J. WILLIAMOWSKY, Primary Examiner

D. W. AROLA, Assistant Examiner